May 8, 1934.                A. E. YOUNG                    1,957,746
                       INTEGRATING MECHANISM
                  Filed April 3, 1933      3 Sheets-Sheet 1
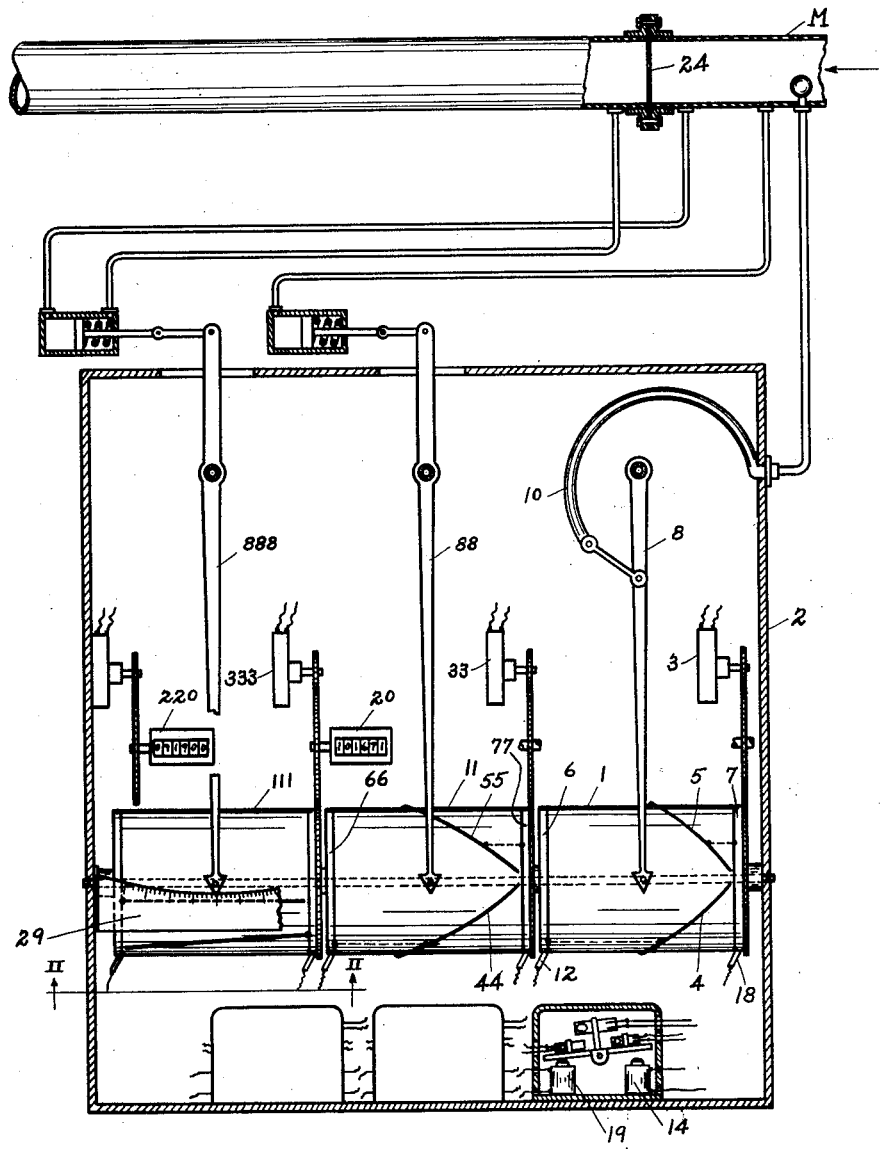
Fig. I
INVENTOR
Archer E. Young
by Christy Christy and Wharton
his attorneys May 8, 1934.  A. E. YOUNG  1,957,746
INTEGRATING MECHANISM
Filed April 3, 1933   3 Sheets-Sheet 2
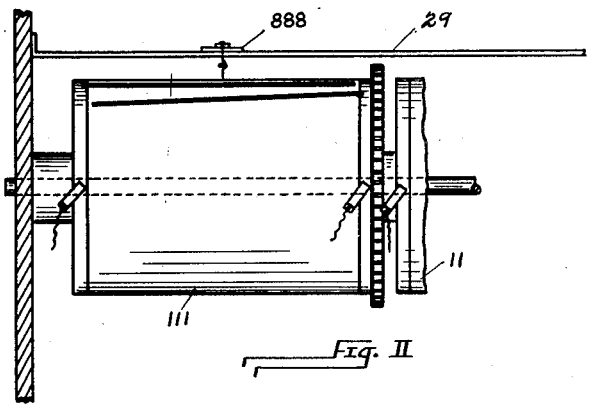
Fig. II
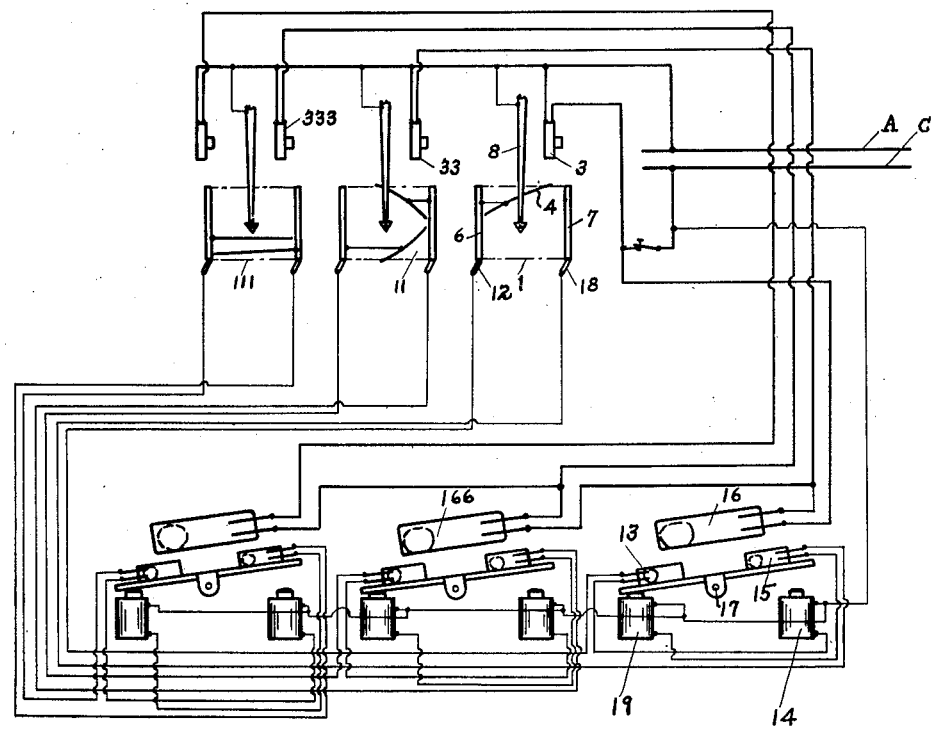
Fig. III
INVENTOR
Archer E. Young
by Christy Christy and Wharton
his attorneys

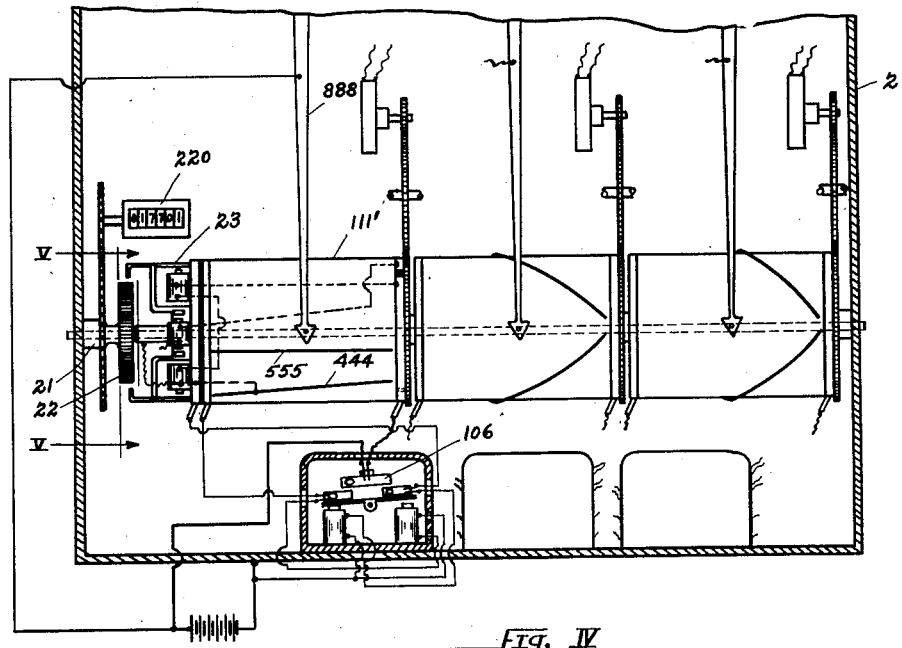
Fig. IV
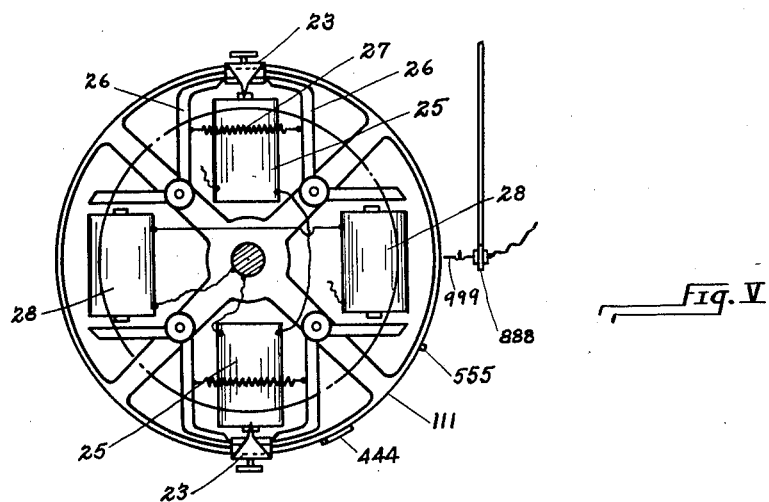
Fig. V

Patented May 8, 1934

1,957,746

UNITED STATES PATENT OFFICE 1,957,746

INTEGRATING MECHANISM

Archer E. Young, Pittsburgh, Pa.

Application April 3, 1933, Serial No. 664,089

16 Claims. (Cl. 235—61)

This invention relates to apparatus for integrating variable quantities, and finds practical application in the measurement of fluid as it advances from a source of supply to a point of consumption. It consists in simplification, and in such refinement of apparatus of the nature indicated as to render it more delicately responsive to the changing values to which it is subject, and as to render it better suited to conditions of service, smoother in running, and better adapted to continue in service with unimpaired accuracy during prolonged periods of service.

In Letters Patent of the United States No. 1,865,996, granted me July 5, 1932, I have described certain integrating apparatus. My present invention is in the same field, and constitutes improvement upon the apparatus there described.

In the accompanying drawings Fig. I is a view in section, diagrammatic in parts, of a gas-meter installation in which my present invention is embodied. Fig. II is a fragmentary view in section, drawn to somewhat larger scale, the plane of section being indicated by the line II—II, Fig. I. It and Fig. I together show certain parts in elevation and on lines of view at right angles to one another. Fig. III is a wiring diagram, illustrative of the electrical operation of the instrument of Figs. I and II. Fig. IV is a fragmentary view, corresponding to Fig. I and illustrating a modification in structure. Fig. V is a fragmentary and sectional view, to larger scale than any of the other figures, on the plane indicated at V—V, Fig. IV.

Referring to Fig. I, a member is provided which moves constantly at uniform speed. This member conveniently takes the form of a cylinder 1, rotatably mounted within a suitable case 2. Means are provided for maintaining the cylinder in constant rotation. Such means are conveniently found in an electrically driven clock 3, energized from a suitable line A C that carries an alternating current (cf. Fig. III). The cylinder is driven by the clock through suitable gearing. Insulated upon the surface of cylinder 1 extend two strips 4, 5 of conducting material. One of these strips, the strip 4, is electrically united with a circumferential band 6 that surrounds the cylinder at one end; the other is electrically united with a band 7 that surrounds the cylinder at the other end. Within case 2 a beam 8 is mounted to swing in a plane approximately tangent to cylinder 1; and beam 8 is equipped with a brush 9 (cf. Fig. V, 999) adapted, as the cylinder rotates, successively to make and break electrical contacts with the strips 4 and 5. The strips 4 and 5 extend divergently upon the surface of the cylinder, so that the interval between them (measured circumferentially of the cylinder) increases gradually from one end of the cylinder to the other end. Means are provided for causing the beam 8 to swing and to carry brush 9 longitudinally of cylinder 1, according to the value of one of the variables to be integrated. In the embodiment shown, such means are found in a Bourdon spring 10 that causes the beam to swing in response to variation in the temperature of a stream of gas flowing within a main M.

By the means described, as cylinder 1 rotates, two electrical contacts are made and broken at a variable interval of time: an interval that is greater or less, according to the temperature of the gas as it flows in the main.

A second movable member is provided, conveniently a rotatable cylinder 11, arranged within case 2, and conveniently mounted on a common axle with cylinder 1. A second electrically driven clock 33 is provided, and its effective through suitable gearing to drive cylinder 11. Electrical control of clock 33 is found in the co-operation of the cylinder 1 (equipped with its contact strips) and beam 8 (equipped with its brush), together with suitable circuits, whereby clock 33 is set in motion by the contact of brush 9 with one strip (e. g. the strip 4) and is stopped when brush 9 makes contact with the other strip (e. g. the strip 5). Cylinder 11, accordingly, rotates in response to rotation of cylinder 1, and, in the course of each rotation of cylinder 1 cylinder 11 rotates during an interval of time that is great or small, according to the extent of rotation of cylinder 1 between successive contacts of brush 9 with strips 4 and 5—that is to say, according to the instant value of the variable, temperature.

Referring to Fig. III, it will be understood that cylinder 1, driven by clock 3, is in constant rotation. The direction of rotation may be assumed to be counter-clockwise, as viewed from the right. When, in the course of cylinder rotation, strip 4 meets the brush borne by beam 8, a circuit is completed from conductor A through beam 8, brush 9, strip 4, band 6, a brush 12 that makes contact upon rotating band 6, a switch 13, an electro-magnet 14, and back to conductor C.

Switch 13 is part of a compound switch structure that includes three switches 13, 15, and 16, illustrated diagrammatically in Fig. III. This collocation of three switches constitutes a rigid unit that swings upon a pivot 17 between the position shown of inclination to the left and a corresponding position of inclination to the right. It continues in either position until in the course of operation it is by properly ordered impulse swung to the alternate position. Each of the three switches consists essentially of a tube (ordinarily of glass) through the walls of which extend the terminals of the circuit to be made and broken, and of a globule of mercury which as the structure swings alternately establishes and interrupts electric continuity between the terminals. In the position shown, the switch 13 is in circuit making condition, and switches 15 and 16 are in circuit-breaking condition; in the alternate position defined above, it is switch 13 that is in circuit-breaking condition, while switches 15 and 16 come to circuit-making condition.

Returning to the description of the course of operation, when the circuit described has energized the electro-magnet 14, the magnet is effective to swing the switch collocation to its alternate position. Thereupon the circuit first traced is by the opening of switch 13 broken, magnet 14 is de-energized, and another circuit is established from conductor A, through clock 33, and switch 16, to conductor C. So long as this circuit continues closed, clock 33 continues to be energized, and cylinder 11 continues to rotate. The shifting of switch 13 to circuit-breaking condition has the effect that in the progress of rotation of cylinder 1 strip 4 passing beyond contact with brush 9 does not in so doing break a still-completed circuit.

When, in the course of rotation of cylinder 1, strip 5 comes to contact with brush 9, a circuit is completed from conductor A, through beam 8, brush 9, strip 5, band 7, a brush 18 that bears constantly on the rotating band 7, switch 15, and an electro-magnet 19, back to conductor C. Electro-magnet 19 being thus energized causes the switch assembly to swing back to the position shown in Fig. III; whereupon the switch 16 comes to contact-breaking condition, the energizing of clock 33 ceases, and cylinder 11 stops. With the swinging of the switch assembly, switch 15 also is shifted to circuit-breaking condition. Consequently, there will be no breaking of circuit by the advance of strip 5 from contact with brush 9. The parts then are in position for repeated operation, when in the course of the rotation of cylinder 1 strip 4 again makes contact with brush 9.

Manifestly it is a matter of properly disposing the strips 4 and 5 upon cylinder 1 and of properly proportioning beam 8 and the Bourdon spring by means of which the beam is swung, to cause the range of turning of cylinder 11 during successive rotations of cylinder 1 to be an always accurate expression of the variable—in this instance the temperature of the gas flowing in the pipe M.

The electrically driven clock 33 is a most serviceable instrument in this association; its pick-up when actuated and its attainment of normal speed are almost instantaneous, and its stopping when the driving current is broken is equally abrupt; and such small error as may arise, because of delay in starting, will find compensation in a corresponding delay in stopping.

The cylinder 11 also is equipped with divergent strips of conducting material 44 and 55, insulated upon its surface, and with terminal bands 66 and 77 with which the strips 44 and 55 are severally connected. A second brush-carrying beam 88 is organized with cylinder 11, precisely as beam 8 is organized with cylinder 1. Beam 88 is caused to swing in response to the valve of a second variable: for instance, the static pressure of the stream of gas flowing in the main M. A third clock 333 is provided. Electrical apparatus which is a duplicate of that already described (as may be seen on examining Fig. III) causes clock 333 to run, with each rotation of cylinder 11, through an interval that is great or less, according to the instant value of such second variable (static pressure). There is, however, this further qualification, that the circuit which is completed through switch 166 to drive clock 333 includes switch 16 also. It follows that clock 333 is inactive throughout so much of the period of rotation of cylinder 1 as is accomplished between the breaking of contact of strip 5 with brush 9 and the making of contact of strip 4 with brush 9; and its activity during the remainder of the period of rotation of cylinder 1 is conditioned by and dependent on the position of cylinder 11. So long as cylinder 11 is so related to the brush borne by arm 88 that contact has been made between strip 44 and the brush, but contact has not yet been made between strip 55 and the brush, the clock 333 will be energized.

Since the rotation of cylinder 11 is in any given interval of time itself an expression of the instant value of another variable (temperature), it follows that the duration of the running of clock 333 during any given interval of time is an expression of the integration of the two variable (temperature and static pressure). A tally 20, 11 driven by clock 333, may by proper proportioning of parts afford register through prolonged intervals of time of this integration.

The clock 333 may be caused to drive a third movable member; and, the third movable member being a cylinder 111, by duplication of parts, including a beam 888 responsive to a third variable (in this case the differential pressure in a stream of gas flowing through an orifice 24 in the main M) a second tally 220 may afford register of a triple integration.

Such integration is manifestly applicable by proper duplication of parts to any desired number of variables.

In the case of gas flowing in a service line, the three variables temperature, static pressure, and differential pressure suffice. It is then entirely practicable so to proportion the parts that the tally 220 shall afford reading in feet of the quantity of gas delivered through the line.

The modification in structure illustrated in Fig. IV will, on comparison with Fig. I, and with the further showing afforded by Fig. V, be seen to consist in the particular means employed for imparting to tally 220 the rotation of cylinder 111. Instead of duplication of the electrically driven clock and the electrical instrumentalities for driving it, the means employed are such as are shown and described in my patent already named, No. 1,865,996.

A rotatable member 21 is mounted for rotation coaxially with cylinder 111'. This member carries integrally a disk 22. The cylinder 111' is equipped with an arm—practically, with a plurality of arms—23 that extend from the end of the cylinder and overhang the perimeter of disk 22. These arms are capable of swinging in planes that are radial with respect to the axis of rotation of the parts, and are adapted in the range of swing to engage and to release the periphery of disk 22.

Normally the arms stand in the positions shown in Fig. IV, free of engagement with the disk, and from such positions they are swung inwardly— that is to say, toward the axis of revolution—to make such engagement. The arms are resilient. Means are provided for swinging them inward against spring tension. When such means are ineffective, the arms stand under spring tension in the inactive positions indicated.

The means for swinging the arms consist of electro-magnets 25 borne by cylinder 111': when the magnets are energized the arms (formed in whole or in part of suitable material) are drawn magnetically to disk-engaging positions. Immediately on such a drawing inward of arms 12 pairs of latches 26 swing under the tension of springs 27 to positions behind the arms, locking them in disk-engaging positions. Electro-magnets 28 are provided which being energized (and the latches being in active positions) are effective upon the latches (formed wholly or in part of suitable material) to withdraw them, allowing the arms 23 under spring tension to return to their inactive positions.

The electric circuit which is made, when in the course of cylinder rotation strip 444 comes to contact with the brush 999 upon arm 888, is effective momentarily to energize the magnets 25. Consideration of Fig. IV and comparison with Fig. I will show that the switch 106 through which the magnet-energizing circuit is completed differs in minute structure from the switches 16, 166, etc. In both cases the switch structures include tubes (they may be understood to be formed of glass) that swing across the horizontal between positions of opposite inclination. Within the tube a globule of mercury runs from end to end as the tube swings. In the structure 16, 166, etc. the two terminals of the circuit penetrate one of the end walls of the tube; in the structure of 106 the terminals penetrate the side wall at a region intermediate the length of the tube. The difference in effect, consequent upon such difference in structure, is that, whereas the switches 16, 166, etc. continue effective (in circuit-making condition) so long as the structure continues at one limit of its range of swing, the switch 106 as it swings makes momentary closure of the circuit as the mercury globule advances from one end of the tube to the other.

This momentary closure of the circuit suffices in the particular association under consideration. The magnets 25 are energized; the arms 23 swung; their clutch-closing office is performed; and immediately, by the closure of the latches 26 behind them, they are secured in their clutch-closing positions. Meanwhile, the magnet-energizing circuit is broken. When in the course of further advance of cylinder 111' strip 555 comes to contact with brush 999, it is again a momentary circuit that is closed through switch 106; but, as before, the momentary circuit suffices: the electro-magnets 28 are energized, latches 26 are swung against spring tension to release positions, and arms 23 resume their release positions. When then the magnets 28 are de-energized, the latches rest against the sides of arms 23, ready to close when the arms 23 are again swung inward.

It will be observed of the instrument of Patent 1,865,996 that the motor provided to drive the initial cylinder must through the clutches drive the succeeding cylinder or cylinders; and that the load upon the motor is not only variable, but doubles and triples. This introduces a problem that may become troublesome. In the provision here described of a separate motor for each cylinder, that problem is eliminated. When, however, it comes to driving the tally in response to rotation of the last cylinder of the series, the added load is relatively slight, and there, as I have shown and described, the clutch mechanism of my earlier patent may be employed.

Figs. I and IV show that the switch mechanisms, within individual casings, may be assembled within the casing 2 of the instrument as a whole.

I have mentioned electrically driven clocks as the motors suitable for driving the cylinders. It is requisite only that these motors be susceptible of running at constant speed. Mechanically driven clockwork may be employed instead, and made subject in known manner to electrical control. In situations where alternating current is not available, electric motors of ordinary type, driven by direct current (advantageously from a common source) may be employed. And in such situations special provision may be made either to prevent or to make correction for irregularities consequent upon variation in current flow. Either a voltage regulator—a known piece of apparatus— may be provided; or an additional tally may be provided, in association with the first cylinder. The motors, if they all be driven from one source, will maintain constancy in relative speed; and the number of revolutions of the first cylinder during a given interval of time, when brought into comparison with a standard number at which the motor-driven cylinder is rated, will afford a factor for making correction of the actual reading of the ultimate tally. If motors other than synchronous motors be employed it will be the more desirable to adopt the alternative shown in Fig. IV and equip the last cylinder with clutch mechanism for intermittently driving the tally.

A graduated scale 29 is shown, fixed in position adjacent to cylinder 111, with respect to which the beam 888 serves as an index finger. This affords ready indication of the instant value of the variable to which beam 888 is responsive: in this instance, differential pressure. Similar graduated scales may be provided to co-operate with either or both of the other beams 8 and 88.

I have described the invention in specific application to the integration of variables in the mensuration of gas. Manifestly it is applicable to the integration of variables generally.

I claim as my invention:

1. In integrating apparatus, a rotary member, a motor driving said rotary member, and an electric control for said motor, including two members, each movable in a direction transverse to the movement of the other and severally responsive to the instant values of two variables and equipped severally with contact pieces adapted to co-operate through an interval in the range of movement of one of the members that is great or small, according to the position of the other member within its range.

2. In integrating apparatus, a rotary member, a motor driving said rotary member, and an electric control for said motor, including two members, each movable in a direction transverse to the movement of the other, means for causing one of said members to move through an interval of time that is great or small in accordance with the instant value of a variable, means for causing the second of said members to move within its range in response to variation in the value of another variable, the two said movable members being severally equipped with contact pieces adapted to co-operate through an interval of time that is great or small, according to the instant position of the said second member.

3. In integrating apparatus, a rotary member, a motor driving said rotary member, and an electric control for said motor, including a constantly rotating, uniformly speeded member, a second member movable transversely of the direction of movement of the rotating member and means for causing the second member to move in response to change in the value of a variable, the constantly rotating member and the second member being severally equipped with contact pieces adapted to co-operate through an interval of time that is great or small, according to the instant position of the second member.

4. In integrating apparatus, a rotary member, a motor driving said rotary member, and an electric control for said motor, including a constantly rotating, uniformly speeded cylinder and a second member movable longitudinally of the cylinder, and means for causing the second member to move in response to change in the value of a variable, the said cylinder being equipped with a pair of contact pieces isolated upon its surface and extending longitudinally of the cylinder and diverging one from the other longitudinally of the cylinder, and the second member being equipped with a contact piece adapted in the course of cylinder rotation to make successive contacts with the two contact pieces with which the cylinder is equipped.

5. In integrating apparatus, a rotary member, an electric motor driving said rotary member, an electric circuit for energizing said motor, a rotating member, a second member movable transversely of the direction of rotation of said rotary member and means for causing the second member to move in response to change in the value of a variable, the rotary member being equipped with a pair of contact strips extending transversely of the direction of rotation and diverging one from another in the course of their extent, and the second member being equipped with a contact piece, means responsive to contact between the said contact piece and one of the pairs of contact strips for closing the motor-energizing circuit, and means responsive to contact between the said contact piece and the other contact strip for opening again the motor-energizing circuit.

6. In integrating apparatus, two rotary members, means for driving the first member, an electric motor for driving the second member, an energizing circuit for said motor, a movable member responsive to the value of a variable associated with the first rotary member, and contact pieces borne by the first movable member and by the associated variable-responsive member and co-operating during a fraction of a rotation of the first rotary member, great or small, according to the instant value of the variable, the first rotary member and the variable-responsive member, so equipped, constituting a control for the energizing circuit for the said motor.

7. In integrating apparatus, three rotary members, means for driving the first member, electrically controlled means including an electric circuit for driving the second member, additional electrically controlled means including an electric circuit for driving the third member, two make-and-break devices arranged one in the circuit associated with the second member and both in the circuit associated with the third member, two movable members severally responsive to the value of two variables and associated one with the first and the other with the second rotary member and contact pieces borne by each of the first and the second rotary members and by the two associated variable-responsive members and co-operating through fractions of rotations of the two rotatable members, great or small, according to the instant positions of the variable-responsive members, a circuit for operating the first make-and-break device including the contact pieces of the first rotating member and its associated variable-responsive member, a circuit for operating the second make-and-break device including the contact pieces of the second rotating member and its associated variable-responsive member.

8. In integrating apparatus a constantly moving member, a second movable member, a motor adapted to drive the second movable member, means including an electric circuit and a switch in such circuit for controlling the operation of said motor, a third member movable in response to the value of a variable in a path adjacent to the first member and in a direction transverse with respect to the direction of movement of the first member, the first member and the third member being equipped with electric contact pieces, the shape and arrangement of the contact pieces being such that they co-operate through an interval of travel of the first member that is great or small, according to the instant position of the third member along its path, and means subject to the co-operation of the said contact pieces for operating said switch.

9. In integrating apparatus a constantly rotating cylinder equipped superficially with two isolated strips of conducting material extending divergently and longitudinally of the cylinder, a member movable in a path that extends longitudinally of the cylinder and movable in response to the changing value of a variable, said member being equipped with a brush with which the strips on the cylinder make successive contact as the cylinder rotates, a second rotatable member, an electrically controlled motor for driving the last-named member, the electric control of the motor including the said co-operating strips and brush, whereby the said motor is effective to drive the second rotatable member during an interval of time which is great or small, according to the position of the said brush-equipped member along its path.

10. In integrating apparatus, a rotatable member, a motor for rotating said member, and means for starting and stopping said motor, such means including an electric circuit and a make-and-break device in said circuit, the make-and-break device including a constantly moving member a second member movable transversely of the direction of movement of the constantly moving member and responsive in its position to the value of a variable, the two said members being equipped with contact pieces adapted to co-operate over an interval of time that is great or small, according to the instant position of the second movable member.

11. In apparatus for aggregating the value of a variable during successive intervals of time, a rotating member, a rotatable member, a motor adapted to rotate the rotatable member, a control for said motor including an electric circuit, means for making and successively breaking such circuit after an interval of time that is great or small according to the instant value of the variable, such means including an electric contact piece movable in response to the value of the variable along a path adjacent to the rotating member first named and transverse to the direction of rotation, and co-operating contact means borne by the rotating member, the last named means being of increasing circumferential extent at successive points along the path of the contact piece first named.

12. In integrating apparatus a rotatable member, a motor adapted to drive said member, electric control for said motor including an electric circuit, means for making and successively breaking said circuit after an interval of time that is great or small, according to the instant value of the variable, such means including two relay circuits and three switches, one arranged in the main circuit, and one arranged in each of the two relay circuits, and two electro-magnets, arranged one in each of said relay circuits, a constantly moving member and a member movable along a path that extends transversely of the direction of movement of the movable member last named, the transversely moving member being responsive in its position along its path to the value of the variable and being equipped with an electric contact piece, and the constantly moving member being equipped with two divergent contact strips extending transversely of the direction of movement, the parts so arranged that successive contacts of the two strips with the contact piece borne by the transversely movable member effects the successive energizing of the two relay circuits with the successive energizing of the two electro-magnets, and the two magnets being thus successively energized effect successively the closing and the opening again of the main circuit.

13. The structure of claim 12 the energizing of either electro-magnet effecting simultaneously the shifting of the switch in the main circuit and the breaking of relay circuit in which it is included.

14. In integrating apparatus three rotatable members, means for rotating the first, two synchronous motors, one for driving each of the second and third rotatable members, two electric circuits for energizing the two synchronous motors, a switch arranged in common in both of the two circuits, and a second switch arranged in the circuit only that energizes the second motor, means for closing the first switch and opening it again after a fraction of a rotation of the first member that is great or small, according to the value of a variable, and means for closing the second switch and opening it again after a fraction of a rotation of the second member that is great or small, according to the value of a second variable.

15. In integrating apparatus a rotating member and a rotatable member, a connecting member borne by the rotating member and movable against spring tension to engagement with the rotatable member and adapted when so moved to impart rotation, an electro-magnet borne by the rotating member and adapted when energized to swing the connecting member against spring tension from inactive to rotation-imparting position, a switch structure including three make-and-break elements mounted for oscillation between make-and-break positions and adapted to stand in alternate positions with one contact closed and two open, the third contact being made and broken again in the course of each oscillation, and two electro-magnets, a member movable in a direction transverse with respect to the direction of rotation of said rotating member and responsive to variation in the value of a variable, such movable member being equipped with an electric contact piece, the said rotating member being equipped with two divergent contact strips, and wiring connecting the parts, so arranged that as the rotating member advances and the strips make successive contacts with the contact piece borne by the variable-responsive member, the two electro-magnets of the switch structure are successively energized and the switch structure swung through a complete to-and-fro oscillation.

16. In integrating apparatus a rotating member and a rotatable member, a connecting member borne by the rotating member and movable against spring tension to engagement with the rotatable member and adapted when so moved to impart rotation, spring-impelled means borne by the rotating member for latching the connecting member in rotation-imparting position, an electro-magnet borne by the rotating member and adapted when energized to swing the connecting member against spring tension from inactive to rotation-imparting position, a switch structure including three tubes adapted to swing in unison from positions of inclination in one direction across the horizontal to positions of inclination in opposite direction, a mercury globule in each tube and a pair of terminals penetrating the walls of each tube and adapted to be be brought into electric continuity and to be separated from such continuity by the movement of the globule of mercury within the swinging tube, the pairs of terminals in two of the tubes being arranged at a tube end the pair in the third tube being arranged in a medial region of the length of the tube, the switch structure including two electro-magnets adapted severally to swing the three tubes simultaneously, one through the range of swing in one direction, the other through the range of swing in opposite direction, a member movable in a direction transverse with respect to the direction of rotation of the said rotating member and responsive to variation in the value of a variable, such movable member being equipped with an electric contact piece, the said rotating member being equipped with two divergent contact strips, and wiring connecting the parts, so arranged that as the rotating member advances and the strips make successive contacts with the contact piece borne by the variable-responsive member the two electro-magnets of the switch structure are successively energized.

ARCHER E. YOUNG.